United States Patent
Pugh

(10) Patent No.: US 7,303,059 B2
(45) Date of Patent: Dec. 4, 2007

(54) CONVEYOR APPARATUS FOR PLACING ARTICLES IN A SINGLE FILE

(75) Inventor: Roger D. Pugh, 11805 Springridge Dr., Fort Smith, AR (US) 72916

(73) Assignee: Roger D. Pugh, Fort Smith, AR (US)

( * ) Notice: Subject to any disclaimer, the term of this patent is extended or adjusted under 35 U.S.C. 154(b) by 22 days.

(21) Appl. No.: 11/193,519

(22) Filed: Jul. 29, 2005

(65) Prior Publication Data

US 2006/0037838 A1    Feb. 23, 2006

Related U.S. Application Data

(60) Provisional application No. 60/602,935, filed on Aug. 19, 2004.

(51) Int. Cl.
*B65G 47/64* (2006.01)

(52) U.S. Cl. ............ 198/448; 198/434; 198/435; 198/443; 198/445; 198/447

(58) Field of Classification Search .......... 198/434, 198/435, 443, 448, 445, 447
See application file for complete search history.

(56) References Cited

U.S. PATENT DOCUMENTS

| | | | |
|---|---|---|---|
| 2,454,285 A | 11/1948 | Krueger | |
| 2,941,651 A | 6/1960 | Hutter | |
| 3,049,215 A | 8/1962 | Hutter | |
| 3,054,497 A | 9/1962 | Davis et al. | |
| 3,224,554 A | 12/1965 | Moulder et al. | |
| 3,469,673 A * | 9/1969 | Gentry | 198/427 |
| 3,471,000 A | 10/1969 | Bodolay | |
| 3,517,794 A * | 6/1970 | Momir | 198/440 |
| 3,561,041 A | 2/1971 | Szmanski | |
| 3,717,236 A | 2/1973 | New | |
| 3,815,782 A | 6/1974 | Miller | |
| 3,837,469 A * | 9/1974 | Kihnke | 198/382 |
| 3,872,647 A * | 3/1975 | Langen et al. | 53/157 |
| 4,047,625 A * | 9/1977 | Grant | 414/651 |
| 4,094,412 A | 6/1978 | Hoppmann et al. | |
| 4,171,045 A | 10/1979 | Lapeyre | |
| 4,279,336 A | 7/1981 | Henderson | |
| 4,369,875 A | 1/1983 | Schmitz | |
| 4,401,203 A | 8/1983 | McDonald et al. | |
| 4,526,269 A | 7/1985 | Henderson | |
| 4,578,001 A | 3/1986 | Ochs et al. | |
| 4,610,345 A | 9/1986 | Spreen et al. | |

(Continued)

FOREIGN PATENT DOCUMENTS

FR    2385623    12/1978

*Primary Examiner*—Gene C. Crawford
*Assistant Examiner*—Kavel Singh
(74) *Attorney, Agent, or Firm*—Gardere Wynne Sewell LLP

(57) ABSTRACT

A conveying apparatus for transport and placement of articles in single file order includes dual parallel infeed conveyors each having an elevating portion for discharging articles onto transverse conveyors whose discharge ends are disposed over elevated discharge conveyors traversing in the opposite direction from the direction of movement of the infeed conveyors. The discharge conveyors include horizontal conveyor runs over which are disposed elongated article guide fences operable to guide articles into single file order but to also force articles not in proper order off of the conveyors into bottomless bins which guide the articles onto the inlet portions of the infeed conveyors for recycling through the apparatus.

14 Claims, 3 Drawing Sheets

U.S. PATENT DOCUMENTS

| | | |
|---|---|---|
| 4,705,156 A | 11/1987 | Boling |
| 4,771,877 A | 9/1988 | Langen |
| 4,830,172 A | 5/1989 | Hilton et al. |
| 4,934,510 A | 6/1990 | Lutgendorf |
| 4,938,082 A | 7/1990 | Buckley et al. |
| 4,962,842 A | 10/1990 | Limoni |
| 5,044,487 A | 9/1991 | Spatafora |
| 5,343,886 A * | 9/1994 | Beswick ..................... 134/131 |
| 5,355,992 A | 10/1994 | Baig et al. |
| 5,372,236 A | 12/1994 | Layer |
| 5,474,493 A | 12/1995 | Tolbert |
| 5,740,899 A | 4/1998 | Pugh et al. |
| 5,794,756 A * | 8/1998 | Taylor et al. ............... 198/429 |
| 6,209,710 B1 * | 4/2001 | Mueller et al. .......... 198/470.1 |

* cited by examiner

CONVEYOR APPARATUS FOR PLACING ARTICLES IN A SINGLE FILE

CROSS REFERENCE TO RELATED APPLICATION

This application claims the benefit of prior U.S. provisional patent application Ser. No. 60/602,935, filed Aug. 19, 2004.

BACKGROUND OF THE INVENTION

Many article manufacturing and handling processes require placement of discrete articles in a single file for processing or packaging. For example, in the processing of edible poultry carcasses it is desirable to convey the carcasses to a processing station by first placing large numbers of carcasses in a single file on a conveyor apparatus. Various equipment has been developed for placing randomly deposited articles in a single file. U.S. Pat. Nos. 5,474,493 and 5,740,899 both disclose and claim improvements in apparatus for handling and single filing articles for processing and transport. However, there are certain applications of such apparatus which require substantial volume of work and/or a particular physical arrangement of the apparatus and there has been a need for such apparatus in the art of article conveying and placement of articles in a single file. It is to these ends that the present invention has been developed.

SUMMARY OF THE INVENTION

The present invention provides an improved apparatus for conveying discrete articles and depositing such articles on a conveyor in a single file or seriatim.

In accordance with one aspect of the present invention, an article conveyor and single file placement apparatus is provided which includes a first conveyor for elevating the articles from a first level to a second level and a second conveyor for reversing the direction of movement of the articles and for forcing the articles to be positioned in a single file. The apparatus may include a third conveyor for transferring articles from the first conveyor to the second conveyor. The second conveyor may operate to discharge out of position articles back to the first conveyor via article guide means.

In accordance with another aspect of the invention, an apparatus is provided with dual elevating conveyors, transverse conveyors and elongated conveyors which reverse the direction of movement of the articles and place the articles in a single file. The apparatus is compact, may utilize conventional conveyor equipment and drive mechanism, but is provided with a unique arrangement for placing articles in line, seriatim or in a single file for further handling.

Those skilled in the art will further appreciate the advantages and superior features of the invention upon reading the detailed description which follows in conjunction with the drawings.

DETAILED DESCRIPTION OF A PREFERRED EMBODIMENT

Figure 1:
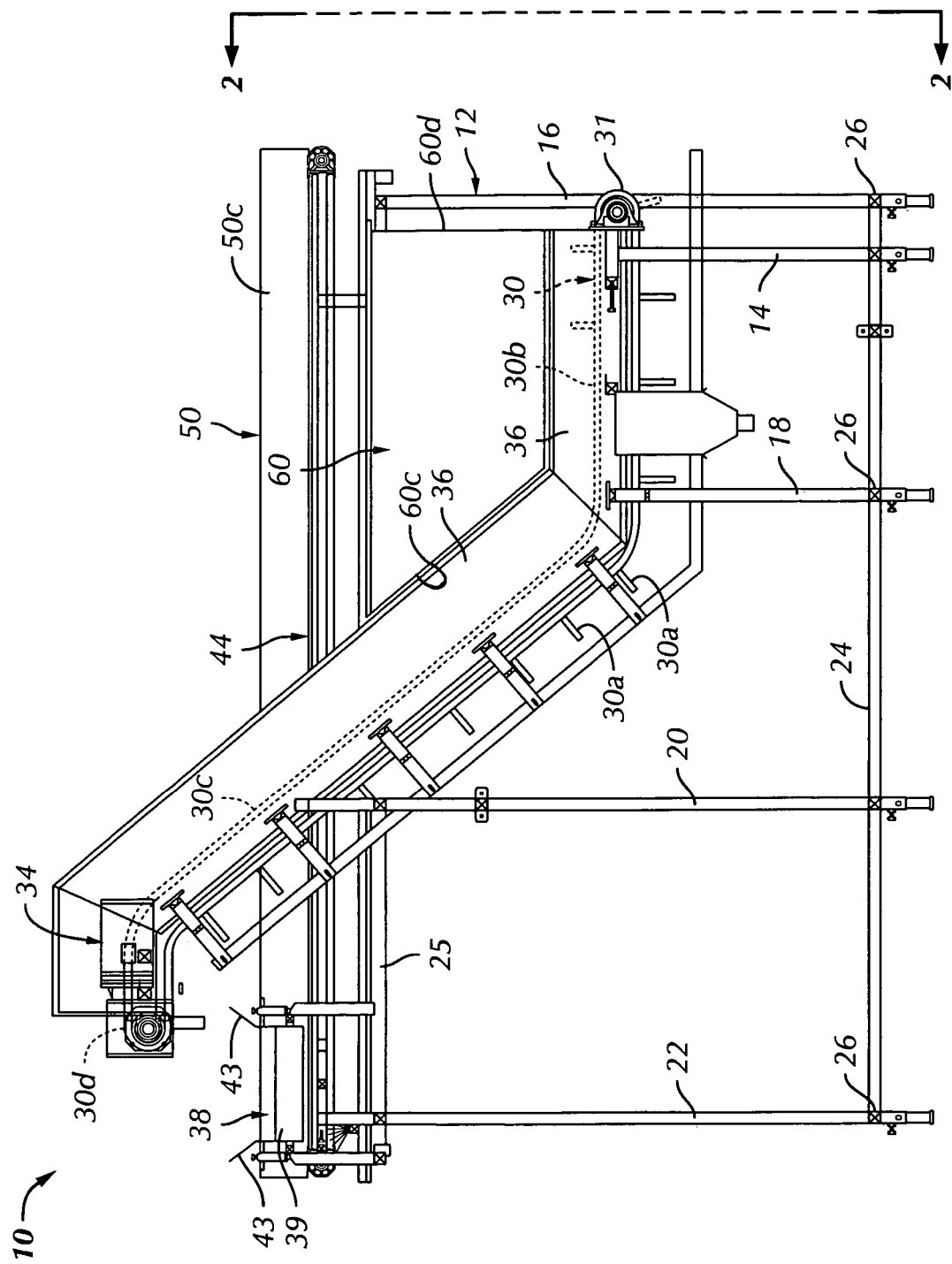
FIG. 1 is side elevation of an apparatus in accordance with the invention.

In the description which follows, like parts are marked throughout the specification and drawings with the same reference numerals, respectively. The drawing figures are not necessarily to scale and certain features may be shown exaggerated in scale or in somewhat generalized form in the interest of clarity and conciseness Referring to the drawing figures, there is illustrated an apparatus for conveying and sorting articles into a single file for transport to storage or further processing, which apparatus is generally designated by the numeral 10. The apparatus 10 may be used for many applications but is particularly adapted for transporting and sorting into a single file articles such as poultry carcasses and the like. Apparatus 10 is characterized by a frame 12 which includes spaced apart sets of vertical column members 14, 16, 18, 20 and 22, FIGS. 1 and 2, which are interconnected by horizontally extending frame members 24, 25 and 26, FIG. 1, to form a support structure for plural conveyor units. The frame 12 may be constructed out of conventional, rectangular or square cross section tubular steel mill shapes suitably welded or bolted together to provide support for the conveyor apparatus. As shown in FIG. 2, suitable crossbrace frame members 27 may be provided to further strengthen the frame 12.

Figure 3:
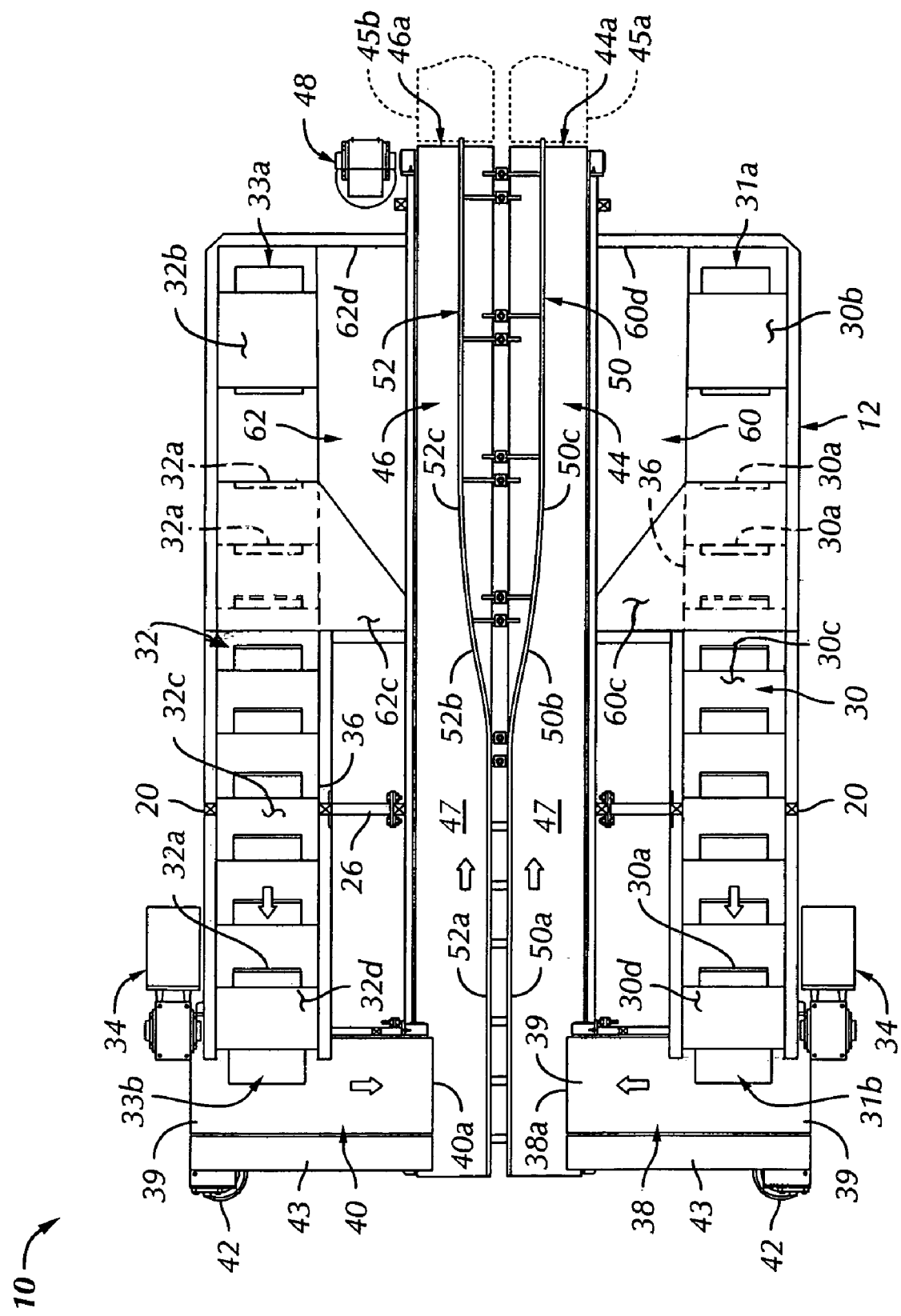
FIG. 3 is a top plan view of the apparatus shown in FIGS. 1 and 2.

The apparatus 10 is further characterized by spaced apart substantially parallel infeed and elevating conveyors 30 and 32 which may be constructed as endless belt-type conveyors having inlet ends 31a and 33a, and discharge ends 31b and 33b, respectively, FIG. 3, and being configured as belts having spaced apart upstanding dividers or treads 30a and 32a providing "compartments" to facilitate transporting articles from a first generally horizontal run, designated by numerals 30b and 32b, through an elevating run portion, indicated by numerals 30c and 32c, FIG. 3, and to an elevated, substantially horizontal discharge run portion 30d and 32d, also as shown in FIG. 3. Conveyors 30 and 32 may utilize conventional belt conveyor structure and associated support rollers and bearings of types known in the art and are driven, respectively, by conventional electric or hydraulic gearmotor units 34, FIGS. 1 and 3. Conveyors 30 and 32 are each provided with opposed and spaced apart parallel side wall guide members 36, respectively, for guiding articles placed on the respective conveyors for transport from the inlet ends 31a and 33a to the discharge ends 31b and 33b, as shown and described.

Figure 2:
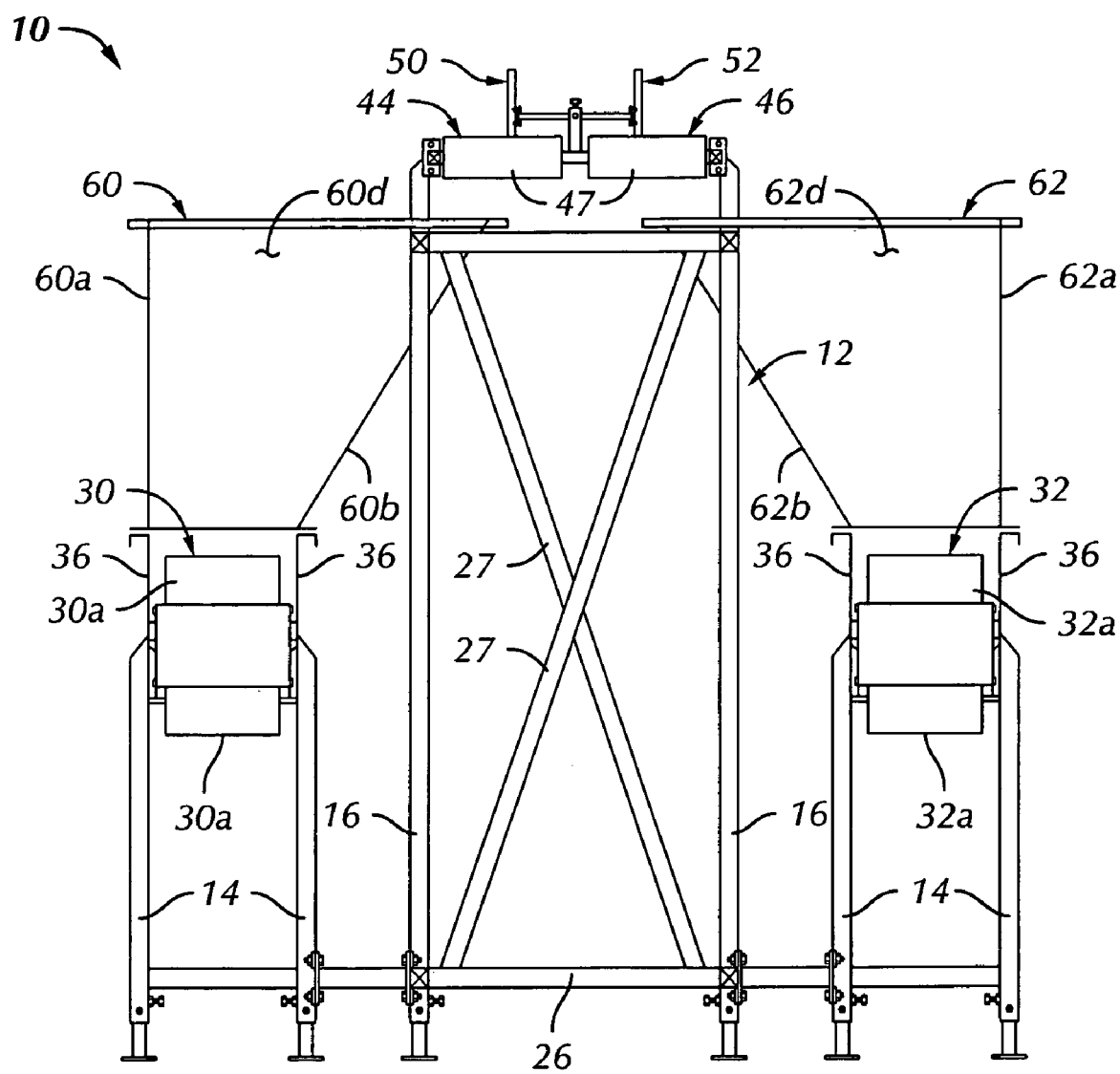
FIG. 2 is a partial end view of the apparatus shown in FIG. 1 taken generally from line 2-2 of FIG. 1.

Elevating conveyors 30 and 32 are adapted to discharge articles onto respective endless belt type conveyors extending transversely to the elevating conveyors and designated by the numerals 38 and 40, FIGS. 1 and 3. Conveyors 38 and 40 are elevated with respect to the inlet ends 31a and 33a of conveyors 30 and 32 and are each characterized by endless belts 39 mounted on conventional rollers and support shafts, not shown in detail, and driven by conventional gearmotors 42, respectively. As shown in FIGS. 1 and 3, conveyors 38 and 40 each include opposed, spaced apart elongated side guide members 43 to minimize the chance of articles falling off of such conveyors.

Conveyors 38 and 40 are provided with respective discharge ends 38a and 40a, FIG. 3, disposed over respective spaced apart conveyors extending substantially horizontally and being designated by the numerals 44 and 46, respectively. Conveyors 44 and 46 are also configured as endless belt-type conveyors including endless conveyor belts 47, respectively, and supported on the frame 12 by conventional roller shafts and the like. The directions of travel of the conveyors 30, 32, 38, 40, 44 and 46 are as indicated by the unnumbered arrows overlying each conveyor as shown in FIG. 3. Conveyors 44 and 46 are driven, preferably synchronously, by a single gearmotor 48, FIG. 3, although each of conveyors 44 and 46 may be separately driven, if desired. The discharge ends of conveyors 44 and 46 are designated by numerals 44*a* and 46*a* in FIG. 3 and are shown disposed adjacent further transfer conveyors 45*a* and 45*b*, for example. Conveyors 30 and 32 could be arranged to discharge articles directly onto conveyors 44 and 46.

As shown in the drawing figures, the conveyors 44 and 46 are disposed adjacent and slightly below elongated article guide fences 50 and 52, respectively. Guide fences 50 and 52 include portions 50*a* and 52*a* extending along the side edges of the respective conveyor belts 47, generally at the inlet or article receiving ends of the conveyors 44 and 46 which are disposed directly below the discharge ends 38*a* and 40*a* of the conveyors 38 and 40, respectively. Guide fences 50 and 52 include curved portions 50*b* and 52*b* which extend partially over the belts 47 and form a transition part between the guide fence portions 50*a* and 52*a* and further guide fence portions 50*c* and 52*c*. Guide fence portions 50*c* and 52*c* extend over the conveyor belts 47 of the conveyors 44 and 46, respectively, and are disposed approximately midway between the lateral sides of the conveyor belts to, in effect, narrow the paths provided for traversal of articles along the conveyors 44 and 46.

Referring still further to FIGS. 1 through 3, the apparatus 10 is also provided with article guide means comprising bottomless collection or guide bin members 60 and 62 which include respective vertical opposed side walls 60*a* and 62*e* and sloping sidewalls 60*b* and 62*b*, FIG. 3. Article collection or guide bins 60 and 62 include sloping end walls 60*c* and 62*c* and vertical end walls 60*d* and 62*d*, see FIGS. 1 and 3, respectively. Bins 60 and 62 are open at their top and bottom ends, extend at least partially under the conveyors 44 and 46 adjacent the discharge ends thereof and are operable to receive articles which have been guided by the fences 50 and 52 in such a way that the articles may fall laterally off of the respective conveyor belts 47 of the conveyors 44 and 46 if the articles are not properly oriented in a single file, for example. In other words, as articles traverse along the conveyor belts 47, they are guided by the fences 50 and 52 and, if the articles are not oriented generally in single file, they will be discharged into the bins or article guiding chutes 60 and 62 and then deposited back onto the conveyors 30 and 32 adjacent the inlet ends 31 and 33 thereof, respectively. Such rejected articles will then traverse the conveyors 30 and 32 back to the conveyors 38 and 40 and then back to the conveyors 44 and 46. In this way, articles being conveyed by the apparatus 10 undergo a reversal in their direction of movement in regard to entering the apparatus 10 and leaving the apparatus and will also be placed in line, seriatim or single file as they traverse the conveyors 44 and 46 towards their discharge ends 44*a* and 46*a*, respectively. Accordingly, a unique apparatus for conveying and sorting articles into a single file for further processing is provided by the apparatus 10.

The construction and operation of the apparatus 10 is believed to be readily understandable to those of ordinary skill in the art based on the foregoing description. Conventional engineering materials and components used in conveyor equipment for food processing operations may be used to fabricate the apparatus 10. Those skilled in the art will also recognize that the apparatus 10 may be used in conjunction with additional conveyor or processing equipment for placing articles on the conveyors 30 and 32 and for receiving articles from the conveyors 44 and 46, such as the conveyors 45*a* and 45*b*.

Although a preferred embodiment of the invention has been disclosed in detail herein, those skilled in the art will also recognize that various substitutions and modifications may be made without departing from the scope and spirit of the invention.

What is claimed is:

1. A conveyor apparatus for placing articles in a single file, comprising:

a frame;

a first conveyor supported on said frame including a first horizontal run portion receiving plural articles and conveying said articles along an elevating portion and a discharge end portion, said articles discharged from said discharge end portion;

a second conveyor receiving articles which have been discharged from said discharge end portion, said second conveyor having opposed lateral sides and disposed generally above said first horizontal run portion of said first conveyor and traversing said articles in a direction substantially opposite the direction of movement of said first horizontal run portion of said first conveyor;

an article guide fence disposed above and extending along at least a portion of said second conveyor and guiding said articles on said second conveyor into a single file and guiding misplaced articles off of said second conveyor laterally from one of said sides of said second conveyor; and article guide means disposed adjacent said second conveyor and guiding said articles discharged laterally from said second conveyor onto said first conveyor.

2. The apparatus set forth in claim 1 including:

a third conveyor disposed adjacent said discharge end portion of said first conveyor for transferring articles from said first conveyor to said second conveyor.

3. The apparatus set forth in claim 2 wherein:

said conveyors are substantially endless belt type conveyors, respectively.

4. The apparatus set forth in claim 2 wherein:

said first conveyor includes a second horizontal run portion between said elevating portion and said discharge end portion for conveying said articles toward said third conveyor.

5. The apparatus set forth in claim 1 wherein:

said first conveyor includes spaced apart tread means formed thereon for supporting articles during movement of said articles along said elevating portion of said first conveyor.

6. The apparatus set forth in claim 1 wherein:

said article guide means comprises opposed sidewalls for guiding articles discharged laterally from said second conveyor onto said first horizontal run portion of said first conveyor.

7. A conveyor apparatus for placing articles in a single file, comprising:

a frame;

a first conveyor supported on said frame including a first horizontal run portion receiving plural articles and conveying said articles along an elevating portion and a discharge end portion, said articles being discharged from said discharge end portion;

a second conveyor receiving articles which have been discharged from said discharge end of said first conveyor, said second conveyor having opposed lateral sides and disposed generally above said first horizontal run portion of said first conveyor and traversing in a direction substantially opposite the direction of movement of said first horizontal run portion of said first conveyor;

a third conveyor disposed adjacent a said discharge end portion of said first conveyor and transferring said articles from said first conveyor to said second conveyor; and an article guide fence disposed above and between said lateral sides of said second conveyor and guiding said articles on said second conveyor into a single file and guiding misplaced articles off of said second conveyor laterally from one of said sides of said second conveyor.

8. The apparatus set forth in claim 7 wherein:
said conveyors are substantially endless belt type conveyors, respectively.

9. The apparatus set forth in claim 7 wherein:
said first conveyor includes spaced apart tread means formed thereon for supporting articles during movement of said articles along said elevating portion of said first conveyor.

10. The apparatus set forth in claim 7 including:
article guide means disposed adjacent said second conveyor and guiding said misplaced articles which have been guided laterally from said second conveyor onto said first horizontal run portion of said first conveyor.

11. The apparatus set forth in claim 10 including:
a fourth conveyor including a first horizontal run portion and an elevating portion;
a fifth conveyor disposed generally adjacent and parallel to said second conveyor receiving articles conveyed by said fourth conveyor;
guide fence means disposed above said fifth conveyor guiding said articles received from said fourth conveyor into a single file and guiding misplaced articles laterally off of said fifth conveyor; and
article guide means disposed adjacent said fifth conveyor for guiding articles which have been guided laterally off of said fifth conveyor onto said first horizontal run portion of said fourth conveyor.

12. The apparatus set forth in claim 11 including:
a sixth conveyor disposed adjacent a discharge end of said fourth conveyor and transferring articles from said fourth conveyor to said fifth conveyor.

13. A conveyor apparatus for placing articles in a single file, comprising:
a frame;
a first conveyor supported on said frame including a first horizontal run portion, an elevating portion and a discharge end portion, said first conveyor includes spaced apart tread means formed thereon for supporting articles during movement of said articles along said elevating portion of said first conveyor;
a second conveyor disposed generally above said first horizontal run portion of said first conveyor and traversing in a direction substantially opposite said first horizontal run portion of said first conveyor;

a third conveyor disposed adjacent a discharge end of said first conveyor for transferring articles from said first conveyor to said second conveyor;

article guide fence means disposed above said second conveyor for guiding articles on said second conveyor into a single file and whereby misplaced articles are discharged laterally from said second conveyor;

article guide means disposed adjacent said second conveyor for guiding articles discharged laterally from said second conveyor onto said first horizontal run portion of said first conveyor in response to deflection by said fence means;

a fourth conveyor including a first horizontal run portion and an elevating portion;

a fifth conveyor disposed generally adjacent and parallel to said second conveyor and adapted to receive articles conveyed by said fourth conveyor;

a sixth conveyor disposed adjacent a discharge end of said fourth conveyor for transferring articles from said fourth conveyor to said fifth conveyor;

fence means disposed above said fifth conveyor for guiding articles on said fifth conveyor into a single file and whereby misplaced articles are discharged laterally from said fifth conveyor; and article guide means disposed adjacent said fifth conveyor for guiding articles discharged laterally from said fifth conveyor onto said first horizontal run portion of said fourth conveyor.

14. A conveyor apparatus for placing articles in a single file, comprising:
a frame;
a first conveyor supported on said frame including a first horizontal run portion receiving plural articles and conveying said articles to an elevating portion and a discharge end portion, said articles being discharged from said discharge end portion;
a second conveyor disposed generally above said horizontal run portion of said first conveyor and receiving articles which have been discharged from said discharge end portion and including a conveyor part having opposed lateral sides and traversing in a direction substantially opposite the direction of movement of said first horizontal run portion of said first conveyor; and
an article guide fence disposed directly above said conveyor part of said second conveyor and extending at least a part of a distance between said lateral sides of said conveyor part of said second conveyor and guiding articles on said conveyor part of said second conveyor into a single file and guiding misplaced articles off of said conveyor part of said second conveyor at one of said lateral sides.

\* \* \* \* \*